Nov. 3, 1953   P. H. PERROT   2,657,774
BRAKE
Filed Aug. 6, 1947   6 Sheets-Sheet 2

INVENTOR.
PAUL H. PERROT
BY
*T.J. Plante*
ATTORNEY

Nov. 3, 1953   P. H. PERROT   2,657,774
BRAKE
Filed Aug. 6, 1947   6 Sheets-Sheet 3

INVENTOR.
PAUL H. PERROT
BY
ATTORNEY

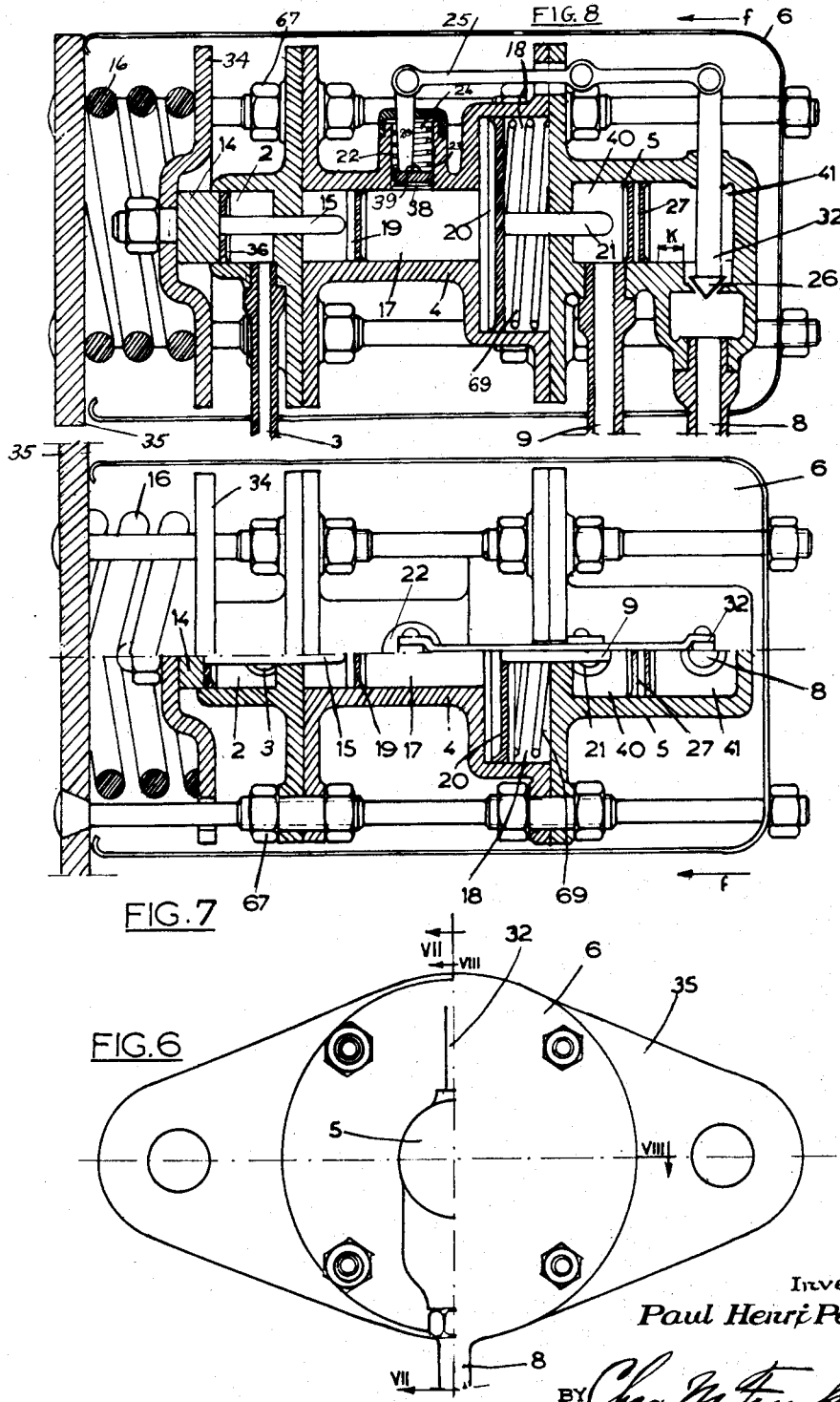

Nov. 3, 1953 P. H. PERROT 2,657,774
BRAKE
Filed Aug. 6, 1947 6 Sheets-Sheet 5

Inventor
Paul Henri Perrot.
BY Chas. M. Funkhouser
Attorney

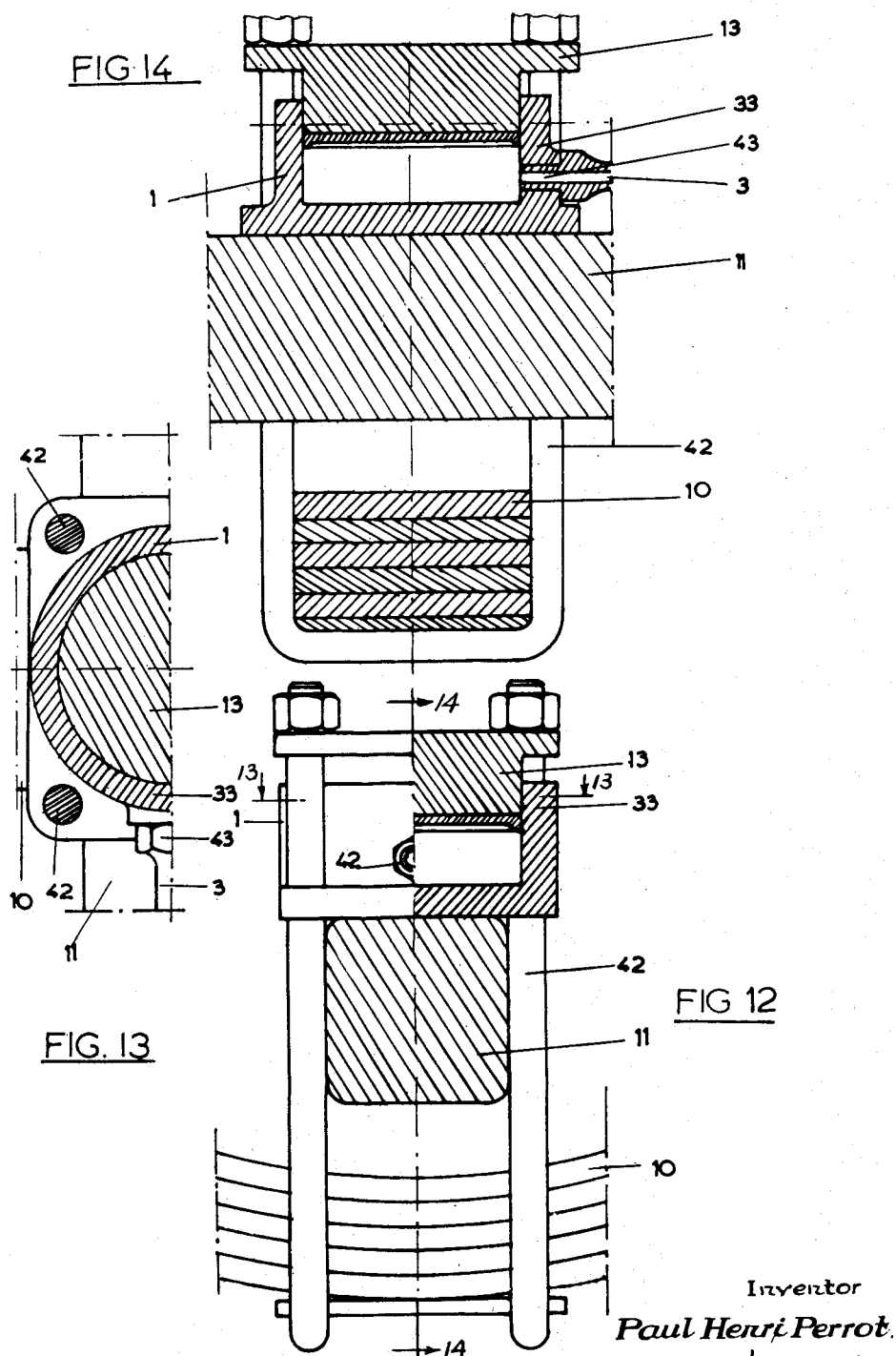

Patented Nov. 3, 1953

2,657,774

UNITED STATES PATENT OFFICE 2,657,774

BRAKE

Paul Henri Perrot, Paris, France, assignor to Bendix Aviation Corporation, New York, N. Y.

Application August 6, 1947, Serial No. 766,518
In France April 16, 1946

Section 1, Public Law 690, August 8, 1946
Patent expires April 16, 1966

6 Claims. (Cl. 188—195)

The present invention relates to brakes and has as a fundamental object to provide a braking system which will apportion the braking retardation between the front and rear wheels in such a manner that the wheels which receive the greatest portion of the load will receive the greatest braking effort.

If one considers a given vehicle, one ascertains that the wheels and the axles are subjected to variations of two kinds:

(a) The static variations caused by the variation of the load of the vehicle during its utilization;

(b) The dynamic variations resulting from the variation of the distribution of load on the axles and the wheels due to deceleration during braking.

To these load variations on each wheel or on each axle correspond optimum braking limits and for a same wheel or a same axle of the vehicle, each braking, taking place in definite load and deceleration conditions, requires a maximum braking moment corresponding to these braking conditions and variable with them. The braking systems built up to the present do not enable the achievement of this result, since for each axle, they realize a sole maximum braking moment which is invariable, whatever be the braking conditions. Also, some constructions tending to realize a braking, taking into consideration the load displacement during the deceleration, do not enable the achievement of this object, since they fix a priori the variation of the braking moment during the braking period, a variation which may be quite different from that which is actually required by the braking conditions and also since they do not take into consideration the variations of the useful load of the vehicles.

One object of the invention is to enable the application to each wheel or to each axle of the vehicle a maximum optimum braking moment, corresponding to the braking conditions, from the point of view of load as well as from that of deceleration and varying with them. In this way, for any braking, whatever be the load of the vehicle and the distribution of this load on the wheels or the axles, it will be possible to apply to these wheels or axles a maximum braking moment so that the vehicle wheels will be prevented from skidding, i. e. without the wheels getting locked. Under any braking conditions will thus be attained, for each wheel or for each axle, a braking effort which is equal and opposite to the adherence force for the maximum braking, this result being automatically realized in direct relation to the conditions of the braking.

Another object of the invention is to measure in a constant way the load carried by the wheels or the axles and to transmit their variations to a hydraulic or a hydro-mechanical device which is also subjected to the action of an opposing spring equalizing these loads.

A further object of the invention is to provide a braking system in which the equalization of the loads carried by the wheels axles on the one hand and the resistance opposed by an opposing spring on the other hand determines the position of a control member adapted to limit either the maximum stroke of the hydraulic operating pistons or the displacement of the operating cable, in such a manner that, as a result, the maximum stroke of the members controlling, in operation, the application of the brake shoes and consequently the pressure applied by these brake shoes, is constantly graduated in proportion to the load carried by the axle or the wheel and varying therewith, this proportion being such (determined and obtained by calculation and design of the members of the system in question) that the applied braking moment is at any instant the optimum braking moment.

Other objects will appear from the following specification taken in connection with the accompanying drawings in which:

Figure 6 is an end view partially in section of a control means for a hydraulically operated braking system;

Figures 7 and 8 are sections of the control means shown on Figure 6 sections taken according to the lines VII—VII and VIII—VIII of the said figure;

Figure 12 is a view partially in section of a measure cylinder forming part of a practical embodiment of a hydraulically or mechanically operated braking system;

Figure 13 is a section of the device of Figure 12 taken according to line XIII—XIII of said figure;

Figure 14 is a section of the device of Figure 12, taken according to line XIV—XIV.

Figure 1:
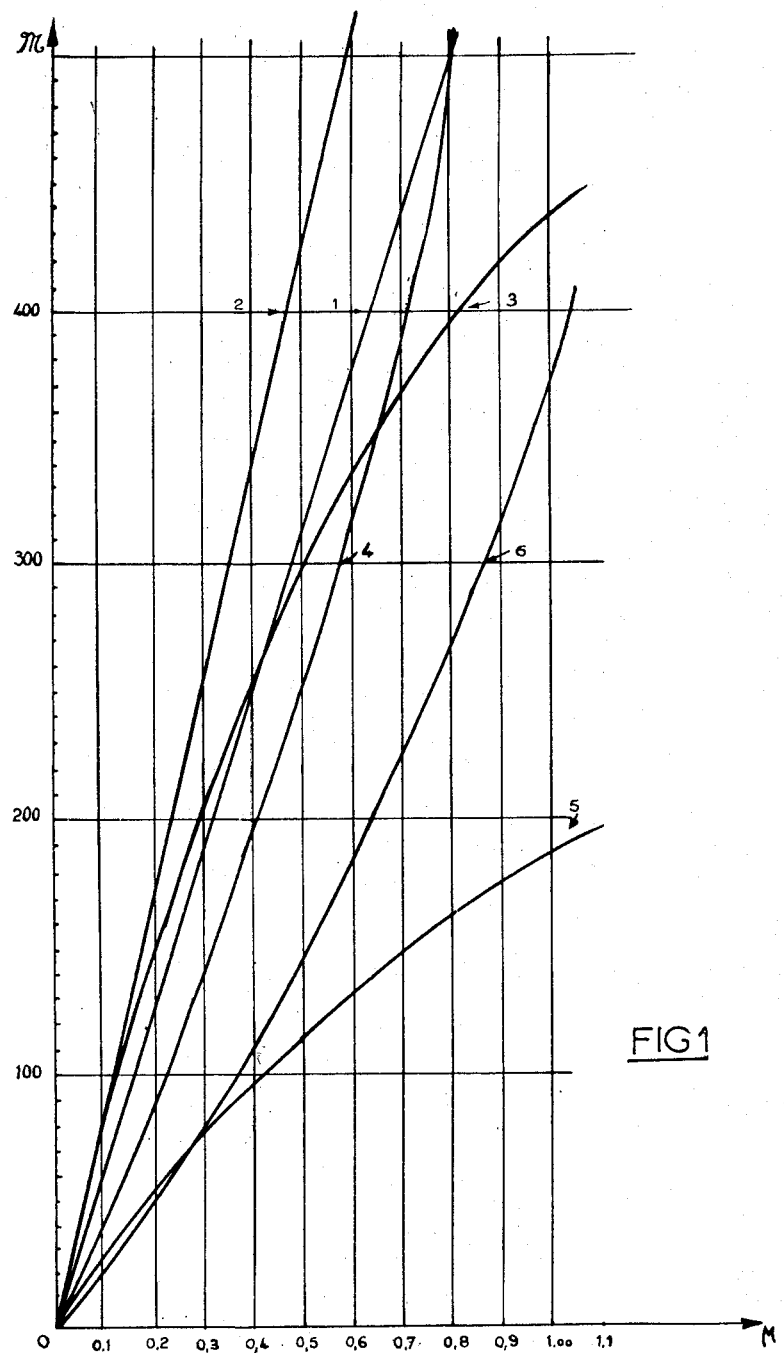
Figure 1 is a diagram of the variations of the braking moments for a useful load of the given vehicle.

The advantages of the present invention appear from Figure 1 where the ordinate represents braking torque and the abscissa represents useful vehicle loads from zero to maximum showing the variation of the braking moments 1—6 according to the variation of the loads actually carried by the axles upon braking to realize the above defined optimum braking, as a function of the deceleration. The ideal curve 4 shows the variation of the front braking moment when using the present invention for the maximum useful load of the vehicle, and the ideal curve 6 shows the same variation for the useful load of the vehicle equal to zero. Similarly the ideal curve 3 shows the variation of the rear braking moment for the maximum useful load of the vehicle, and the ideal curve 5 shows the same variation for the useful load of the vehicle equal to zero. On the other hand, the straight line 1 shows the variation of the front braking moment obtained with the conventional braking systems not provided with the device embodying my invention, and the straight line 2 shows the same variation but of the rear braking moment.

For each axle (front and rear) there exists for each useful load of the vehicle a curve similar to curves 4 and 6 and 3 and 5, all said curves being comprised for each axle between the curves 4 and 6, and 3 and 5, corresponding to the two limits of the useful load of the vehicle.

The spacing of the curves and of the straight lines on the same ordinate for the front axle and the rear axle, represents the difference between the applied braking moment and the braking moment actually necessary, upon use of conventional braking systems not provided with means embodying by invention.

The invention enables the building up of the optimum braking moment corresponding at each moment to the real load supported by each wheel or each axle so as to realize actual braking curves corresponding to the families of curves 4 and 6 and 3 and 5 instead of obtaining, as with the conventional braking systems, in an invariable way the straight lines 1 and 2. This method of braking enables the realization of a braking moment, the figurative point of which will always be on the optimum braking curve of the respective axle or wheel, for the useful load of the given vehicle.

Figure 2:
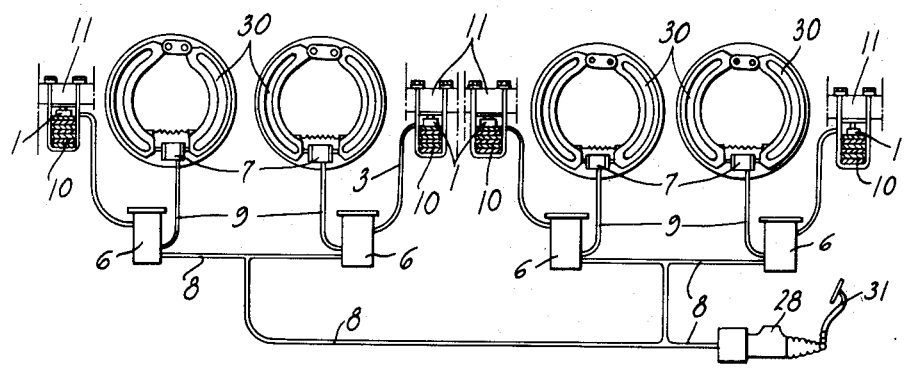
Figure 2 is a diagrammatical view of a hydraulic braking system in which the braking moment is adapted to vary for each wheel.
Figure 3:
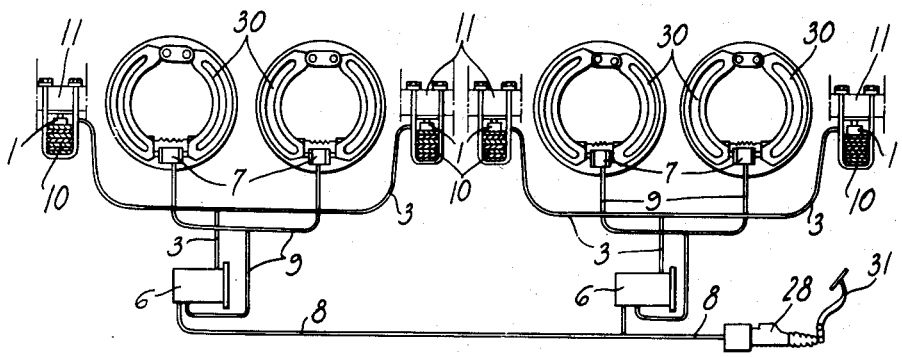
Figure 3 is a diagrammatical view of a hydraulic braking system in which the braking moment is adapted to vary for each axle.

Figures 2 and 3 show a general layout of a hydraulically operated braking system and its relation to the other conventional brake members or to the members intervening in the operation of my novel system. Figure 2 shows a mechanism in which the braking moment is controlled for each wheel, while Figure 3 shows a mechanism in which the braking moment is controlled for each axle.

In this system, the four wheel brakes 30 are controlled by wheel cylinders 7 which are connected to the general brake line 8 through the intermediary of branch conduit 9 and of the control means 6. The general brake line 8 ends at the master cylinder 28 actuated by the brake pedal 31. On the other hand, the control means 6 is connected to a measure cylinder 1 by conduit 3. This measure is placed between the axle or the half-axle 11 and the corresponding suspension spring 10 or in a more general manner between a member connected to the wheel or the axle and any adjacent member connected to the frame or the body of the vehicle.

It is to be noted that this system comprises, in addition to the conventional brake members, a measure cylinder 1 for each wheel and a control means 6 for each wheel or axle.

Each measure cylinder (Figure 12) comprises a piston 13 secured to a vehicle suspension spring 10 or generally speaking to a suspended member of the vehicle 10 by rods 42. The axle or half axle 11 carries a cylinder casing 33. At the lower end of the cylinder 33 is located a nipple of the conduit 3 connecting the measure cylinder 1 to the control means 6. On Figure 12 the suspension spring 10 is shown as passing below the axle or half axle 11 which is very frequent on commercial vehicles. Sometimes a reverse arrangement can be used. The operation is similar in both cases. In this manner the transmission of the load exerted by the suspended part onto the non-suspended part of the vehicle is transmitted through the intermediary of the measure cylinder unit subjected to the variations of the load onto the respective wheel.

The control means (Figures 6, 7 and 8) comprises a control cylinder 2, a pressure reducing means 4, a transmission cylinder 5 and a shut-off member 32.

The measure cylinder 1 is connected to the control means 6 and more particularly to the control cylinder 2 by the conduit 3. In the control cylinder 2 reciprocates a piston 14. The space comprises between the measure cylinder 1, the control cylinder 2 and their respective pistons 13 and 14 and the conduit 3 is filled with operating fluid in such a manner that the displacements of the two pistons within the cylinders are interconnected with each other.

The rear face of the piston 14 formed by a head 34 is subjected to the action of a spring 16 taking support on a fixed member 35, which is generally secured to the frame or a fixed part of the vehicle. The position of the two pistons 13 and 14 depends on the equilibrium of the following forces: action of the spring 16 on the piston 14 and action of the loads transmitted to the piston 14, in such a manner that the position of the piston 14 is a function of the load transmitted to the piston 13, i. e. of the load carried by the axle or the wheel.

The displacement of the piston 14 is limited in the direction opposite to that of arrow F by abutment of the head 34 connected to piston 14 with the casing of the pressure reducing means (Figure 8) or with the bolts 67. The piston 14 is extended on its front face 36 by a rod 15 integrally made therewith. This rod limits the displacement of the piston 19 in the direction of the arrow F.

The pressure reducing means comprises two cylinders 17 and 18 of different diameters located either along the same axis or not and in which are mounted pistons 19 and 20. The space comprised between these two cylinders 17 and 18 and limited by pistons 19 and 20 is filled with fluid, in such a way that displacements of the two pistons are interconnected and are in inverse ratio of the surfaces of these pistons. As set forth above, the displacement of the piston 19 is limited by the rod 15 upon displacement in the direction of arrow F. On the other hand, a rod 21 extends from the piston 20 and is made integrally therewith. This rod limits the displacement of the piston 27 in the direction of arrow F. When the piston 14 reaches the position corresponding to the end of its stroke, in the direction opposite to arrow F, the two pistons 19 and 20 are also at the end of their stroke.

A third cylinder 22 which can be integrally made with the pressure reducing means 4 or connected thereto by a conduit is provided with a piston 23, on the face 38 of which acts the operating fluid of the pressure reducing means 4 and on the face 39 of which acts a spring 24. The piston 23 controls through the intermediary of a lever 25 the progressive closing of a shut off device 32, controlling the admission of fluid from the general brake line 8 into the transmission cylinder 5.

A spring 69 operating as a return spring acts onto the rear face of the piston 20. The transmission cylinder 5 is divided into two chambers 40 and 41 by means of a movable piston 27. The front chamber 41 is connected to the general brake line 8 through the intermediary of a needle 26 forming part of the shut off device 32, the control of which has been described before. When the shut off needle 26 is open, the front chamber 41 is subjected without restriction to the pressure variations and the displacements of fluid in the general brake line 8 resulting from the actuation of the brake pedal 31 by the vehicle's driver. On the contrary, the progressive closing of the shut-off needle 26 limits the integral transmission of the variations of pressure and displacements of fluid. The rear chamber 40 is in constant connection, through the intermediary of the conduit 9, with wheel cylinder or cylinders 7. The piston 27 transmits the displacements of fluid and variations of pressure from the front chamber 41 to the rear chamber 40. Wheel cylinders 7, conduit 9 and rear chamber on the one hand, front chamber 41 and the general brake line 8 connected to the master cylinder 28 on the other hand are filled with conventional fluid used for hydraulically actuated brakes.

During running of the vehicle, each wheel carries a more or less constant load and the position of the pistons 13, 14, 19, 20 and 27 and the control rods 15 and 21 is substantially invariable.

Light shocks are absorbed by the hydraulic inertia of the system and violent shocks have to be assimilated to a dynamic variation of the loads on the axles or the wheels, necessitating the setting into operation of the present device which effectively takes place, as indicated above.

Upon a variation of the load on each wheel or each axle due either to a variation of the useful load or to a dynamic variation of the distribution of the loads during a deceleration, the positions of pistons 13 and 14 in the cylinders 2 and 33 will be altered as follows:

Take, for example, a reduction of load on a wheel or axle in question. The piston 13 is subjected to a decrease of load transmitted to the piston 14 by the operating fluid. This load decrease is transmitted to the spring 16 which then takes an axial expansion of $n$ millimeters. This displacement is followed by piston 14 and consequently by rod 15 under the action of the spring. The piston 13 also shifts for a length which is a function of the ratio of the sections of the two cylinders 2 and 1. The rod 15 will have, first, a free stroke, then will contact piston 19 of the pressure reducing means 4 which it will push till the equilibrium of forces on the pistons 13 and 14 causes an equilibrium of the whole system.

On the other hand, suppose that at this moment the driver actuates the brake pedal 31. The master cylinder 28 transmits to the transmission cylinder 5 the application force. The piston 27 is subjected freely to the displacements of fluid and pressure variations which are thus produced and transmits them to the wheel cylinders 7. The stroke is free at first, then, from a certain stroke depending upon the braking conditions, the piston 27 meets the rod 21 which it pushes in the direction of arrow F as well as the piston 20 connected to the rod 21.

The movements of the two pistons 19 and 20 thus described can take place simultaneously or separately, according to the braking conditions. From a certain moment depending on the braking conditions, the relative movement of the two pistons 19 and 20 in the pressure reducing means 4 will compress the operating fluid, in such a manner that this pressure, transmitted by the piston 23, will cause the progressive and proportional compression of the spring 24, which will result in the progressive and proportional closing of the shut-off needle 26. At this moment, pressure increase exerted in the master cylinder 28 cannot be integrally transmitted to the wheel cylinders 7 and the sizes of the elements are selected in such a manner that the pressure which is thus transmitted to the cylinders 7 generates such a braking moment that is equal to the theoretical maximum optimum braking moment corresponding to the load on the axle or on the wheel in question.

If, at that time, a load increase on a respective axle or wheel takes place, the piston 13 transmits this load increase to the piston 14, through the operating fluid, and the spring 16 is then subjected to a compression of $n$ millimeters. The piston 14 and the rod 15 are likewise subjected to a displacement of $n$ millimeters in the direction of the arrow. The piston 13 is also subjected to a displacement as a function of the ratio of the cylinder sections 2 and 33. The rod 15 having receded by $n$ millimeters, the piston 19 has a free stroke in the direction of the arrow F.

As it is subjected, on the other hand, to the action of the fluid or of the pressure reducing means 4, and through its intermediary, of the spring 24, the piston 19 then recedes in the direction of the arrow F which permits the fluid of the pressure reducing means 4 and the spring 24 to expand. The expansion of the spring 24 then controls a corresponding opening of the shut-off needle 26 which is never completely closed to permit constant fluid communication between line 8 and one side of piston 27. If the pressure on the brake pedal 31 continues, the piston 27 tends to move in the sense of the arrow F pushing the rod 21, so as to equalize the pressures fore and aft of the piston 27. The piston 27 thus pushes the rod 21 till this equilibrium is attained or till this receding of the piston 20 in the cylinder 18 causes a pressure increase in the pressure reducing means providing the progressive closing of the shut-off needle 26 as set forth above.

If the pressure on the brake pedal 31 is removed, the pressure in the chamber 40 will become higher than that of the chamber 41. The piston 27 will recede in the direction opposite of the arrow F, which will have for result the receding in the same direction of the rod 21 and of the piston 20. The spacing of the piston 20 with respect to the piston 19 enables the expansion of fluid of the pressure reducing means 4 and of the spring 24. The expansion of the spring 24 then causes a corresponding opening of the shut-off needle 26 till its complete opening, which enables a normal flow of fluid from the chamber 41 into the line 8, like at end of ordinary braking.

It is to be noted that the expansion of the spring and the drop of pressure of the liquid in the pressure reducing means 4 controlling the opening of the shut-off needle 26 are always due to the fact that one or the other of the two pistons 19 and 20 are no more subjected to constraint on the side opposite to the fluid and are free to move under the effort exerted by the pressure of the fluid. If desired, a by-pass orifice may be used between valve 25 and its seat to prevent absolute fluid closure of this valve.

It has been pointed out that the strokes of the pistons 14 and 20 are limited in the direction opposite to the arrow F, this limit corresponding to a predetermined load, carried by the wheel or the axle. Thus the stroke of the rod 21 is also limited in the direction opposite of arrow F till a distance corresponding to this predetermined load. The stroke of the rod 21 is purposely made shorter than the total possible stroke of the piston 27, so that the piston 27 always has a beginning of free stroke in the direction of the arrow. Only after having freely covered the distance $k$, can the piston eventually meet the rod 21, i. e. it is only from a certain predetermined load that the device can come into action.

Thus the device embodying the invention only comes into action from the predetermined load, and before this moment, the operation takes place as if such load did not exist, and the present invention intervenes only when the predetermined load is attained on the axle or on the wheel.

Figure 4:
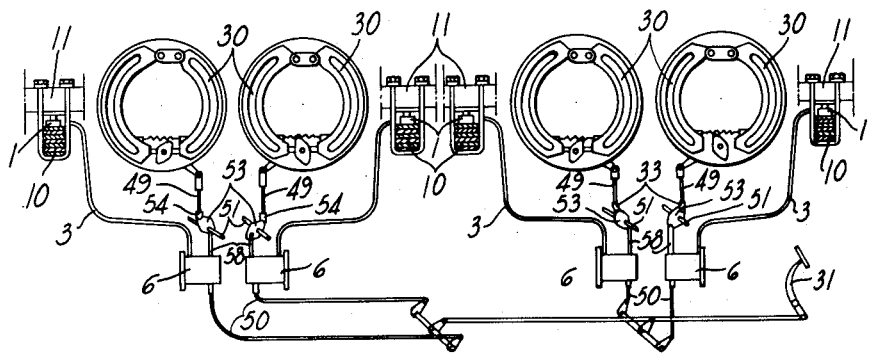
Figure 4 shows the general layout of a mechanical braking system in which the braking moment is adapted to vary for each wheel.
Figure 5:
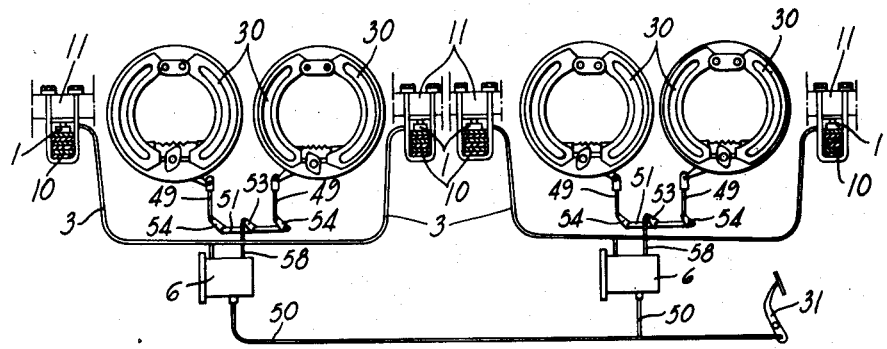
Figure 5 shows a general layout of a mechanical braking system in which the braking moment is adapted to vary for each axle.

The invention can also be applied to a mechanically operated braking system. On Figures 4 and 5 is shown the general layout of the mechanical braking system and its relation to the other conventional brake members, or other members intervening in the operation of the device. Figure 4 shows a system in which the braking moment is adjusted on each wheel, while Figure 5 relates to a system in which the braking moment is adjusted for each axle. On these figures are shown the four wheel brakes 30 provided with their operating levers 49 connected to the brake pedal 31 by a system of cables and by an equalizing means 58, 53 and 54, by the control means 6 and by the operating cable 50. The control means 6 is connected to the measure cylinder 1 by the conduit 3. This measure cylinder 1 is located between the axle or the half-axle 11 and the corresponding suspension spring 10, or in a more general manner in cooperation with any member connected to the frame or to the body of the vehicle and any other adjacent member connected to the wheel or to the axle.

It is to be noted that this system comprises, in addition to the usual braking members, a measure cylinder 1 for each wheel and a control means 6 and its lever system 53 and 54 for each wheel axle.

Figure 11:
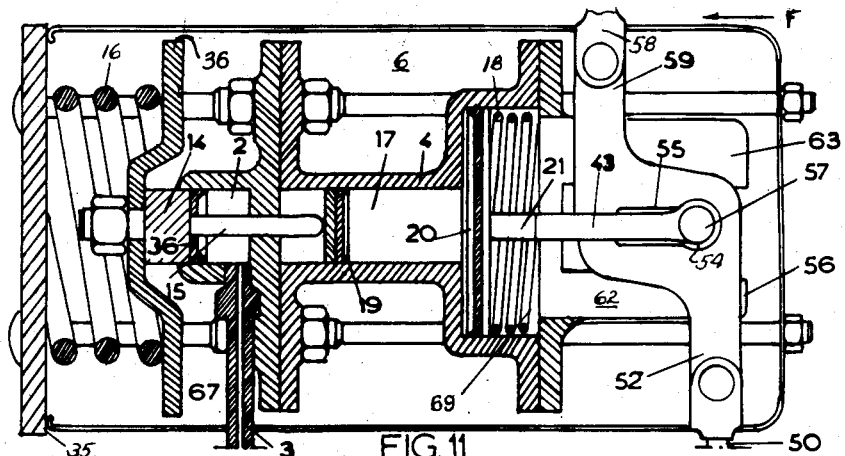
Figures 10 and 11 show sections of the control means of Figure 9 according to line X—X and XI—XI of said figure.
Figure 10:
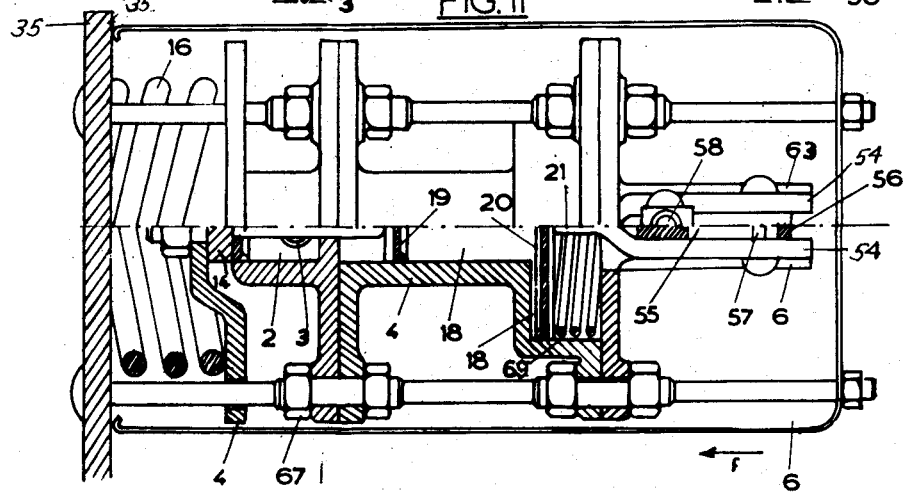
Figure 9:
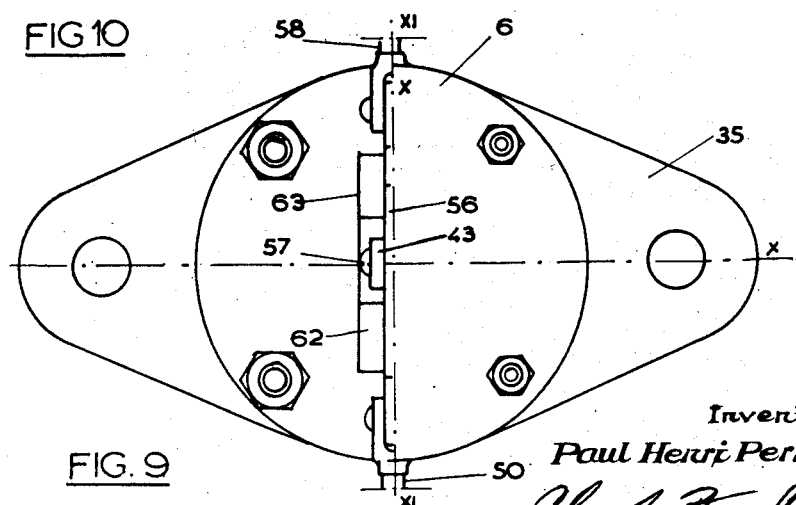
Figure 9 is similar to Figure 6 and is an end view of a control means for a mechanically operated braking system.

As set forth previously, the displacement of the piston 19 (Figures 9 to 11) is limited on its stroke by the rod 15. The spring 69 acts onto the rear face of the piston 20 to realize within the system such a state of equilibrium that the pistons 19 and 20 are always in the position corresponding to that of piston 13, i. e. corresponding to the load supported by the respective axle or wheel. This result is obtained due to the fact that under the action of the spring 69, the piston 20 and the piston 19 connected thereto are pushed into the direction of the arrow F until the piston 19 is in contact with the control rod 15. In certain cases, the interposition of the pressure reducing means is not necessary, and the rod 15 is simply extended by the rod 21 without interposition of any intermediary device.

The rod 21 is provided at its end with two fork members 43 between which extends a lever 56. The fork ends 54 are connected by a pin 57 around which pivots the lever 56. The pin 57 has no fixed position with respect to the lever 56; this position depends on the whole equilibrium of the system described above, as it can move freely in the slot 55 formed in the lever 56. One of the ends 52 of the lever 56 is connected to the brake cable 50 leading to the brake pedal 31. The other end 59 of the lever 56 controls through the intermediary of a connecting bar 58 (Figures 4 and 5) an equalizing bar 53 pivoted on a fixed pin 51 and the ends 54a of which, free from connection with the lever 56, are connected to the brake cable 49 leading to the brake 30. The system of lever 56 and of the equalizing bar 53 is such that the force applied to the brake pedal 31 is transmitted by the cable 58 in a variable way, according to the position of the pin 57 in the slot 55 of lever 56, depending upon the ratio of the lengths of the two arms of the lever 56 on either side of the pin 57.

Two shields 62 and 63 guide the bar 43 and lever 56 in their plane of rotation.

This embodiment operates in a manner similar to that described above.

It will be assumed that a decrease of load on the respective wheel or axle takes place. The piston 13 is subjected to a load decrease which is transmitted to the piston 14 by the operating fluid. This load decrease is transmitted to the spring 16 which then takes an axial expansion of $n$ millimeters, this expansion being followed by a corresponding displacement of the piston 14 and consequently of the rod 15, in the direction opposite to the arrow F. The rod 15 pushes the piston 19 which, through the intermediary of the operating fluid, pushes piston 20, which, then slightly compresses the return spring 69.

The rod 21 and the fork 43 are then moved in the same direction as the piston 20. The pin 57 is displaced for the same distance as the piston 20 within the slot 55 of the lever 56. The axis of rotation of the lever 56 then varies in function of the load carried by the wheel or the axle.

On the other hand, if during this time, an effort is applied by the driver to the brake pedal 31, the two levers 56 and 53 transmit this effort to the brake through the intermediary of cables 50 and 49. The displacement of the pin 57, displacing the center of rotation of said lever 56 causes a change in the lengths of the arms of the lever 56. It results therefrom that, for the same effort applied to the pedal 31, i. e. for a same tension exerted on the cable 50, one will obtain a different tension o ncable 49, consequently a different braking. For example, if the load on the axle in question increases, the pistons 14 and 20 and rods 15 and 21 recede in the direction of arrow F, and the pin 57, forming the axis of rotation of the lever 56, effects the same movement. In this manner, the length of the lever arm adjacent the cable 50 decreases and the length of the lever arm transmitting the movement to lever 53, increases. Under these conditions, for the same displacement of the brake cable 50 connected to the brake pedal 31, i. e. for the same effort on said pedal 31, the displacement of the brake cable 49 leading to the brake will be more important. The ratio of these displacements will be equal to the ratio of the two lever arms 56 and the obtained braking will vary as a function of the relative variations of the two arms of the lever 56, i. e. as a function of the position of the pin 57. In this manner, there will be realized a braking, variable with the position of the axis of rotation 57 of the lever 56, a position depending on the load carried by the axle or by the wheel, and the variation of the braking will correspond to the displacement of the axis of rotation 57 of the lever 56, i. e. to the load variations on the wheel or on the axle, the elements of the control means being calculated and measured in such a manner that the braking moment thus obtained is at any instant the optimum braking moment.

It has been pointed out that the stroke of piston 14 was limited in the direction opposite to arrow F, which also limits the stroke of piston 20, since a return spring 69 interconnects the displacements of the two pistons 14 and 20. This limit corresponds to the so called critical load, carried by the wheel of the axle. In this way, the stroke of the rod 21 is equally limited in the direction opposite to the arrow F till a point corresponding to this critical load. In consequence, the possible displacement of the axis of rotation 57 of the lever 56 is limited and only starts from the critical load. Thus, until this critical load is attained, the braking obtained for the same action on the pedal is constant, whatever be the load carried by the wheel on the axle.

Upon release of the pedal, the braking action is also released, since if the position of the axis of rotation of the lever 56 controls the braking intensity, it has no more action when the braking stops, and everything then takes place as in a conventional braking system.

Although only a limited number of embodiments have been illustrated and described, it is to be expressly understood that the invention is not limited thereto. Various changes in the design and arrangement of parts illustrated will now be apparent to those skilled in the art and may be made without departing from the spirit and scope of the invention. For a definition of the limits of the invention reference is had primarily to the appended claims.

What I claim is:

1. In a vehicle braking system having front brakes, the combination of a hydraulic master cylinder operatively connected to said brakes, vehicle load responsive means controlling the distribution of the braking moment between the front and rear brakes, a closed hydraulic system constituting a pressure reducing means arranged between the load responsive means and the applying means, and means actuated by said closed hydraulic systems to vary the rate of fluid delivery from the master cylinder to a respective brake.

2. A vehicle braking system having front and rear brakes, applying means operatively connected to said brakes, load responsive means controlling the distribution of the braking moment between the front and rear brakes, and a closed hydraulic system constituting a pressure reducing means operatively connected to both said load responsive means and said actuating means, and arranged to control the rate at which said brakes receive braking effort from said applying means, said last mentioned means including two pistons of different diameter, one of said pistons being operatively connected to the brake applying means and the other to the load responsive means.

3. For a vehicle braking system having at least one fluid pressure operated brake, applying means adapted to be operatively connected to the brake, vehicle load responsive means arranged to develop a fluid pressure proportional to the vehicle load imparted thereto, and a pressure reducing device constituted by a closed hydraulic system operatively connected to both said load responsive means and said brake applying means to impart a brake applying pressure proportional to that of said load responsive means.

4. For use in a vehicle braking system, a master cylinder, a vehicle load responsive means, a brake applying means, a pressure reducing valve device constituted by a closed hydraulic system operatively connected on one side to said load responsive means and on the other side to said brake applying means and containing therebetween means for selectively imparting communication of master cylinder generated pressure to actuate said brakes, said communication of master cylinder pressure being regulated by said closed hydraulic system under the influence of the pressure responsive means and the master cylinder pressure.

5. For use in a vehicle braking system, a master cylinder, a load responsive means, a brake applying means, a pressure reducing means consisting of a closed hydraulic system having operative connection with said load responsive means and said brake applying means and containing therebetween means for selectively imparting communication of master cylinder pressure to said brake applying means in proportion to the pressure generated by said load responsive means.

6. In a vehicle braking system having front and rear brakes the combination of a hydraulic master cylinder operatively connected to the said brakes, means responsive to the vehicle load applied to a wheel, a pressure reducing means constituted by a closed hydraulic system and actuated by said load responsive means and said master cylinder pressure to directly control the rate of fluid delivery from the master cylinder to a respective brake.

PAUL HENRI PERROT.

References Cited in the file of this patent

UNITED STATES PATENTS

| Number | Name | Date |
| --- | --- | --- |
| 468,618 | Hinckley | Feb. 9, 1892 |
| 668,880 | McCarthy | Feb. 26, 1901 |
| 720,359 | Kimball | Feb. 10, 1903 |
| 976,000 | Schenck | Nov. 15, 1910 |
| 1,107,505 | Ewald | Aug. 18, 1914 |
| 2,143,871 | Fator | Jan. 17, 1939 |
| 2,169,629 | Browall | Aug. 15, 1939 |
| 2,250,725 | Ranson | July 29, 1941 |
| 2,363,580 | Farmer | Nov. 28, 1944 |
| 2,367,115 | Goepfrich | Jan. 9, 1945 |
| 2,394,038 | Browall | Feb. 5, 1946 |
| 2,405,939 | Browall | Aug. 20, 1946 |
| 2,424,913 | Browall | July 29, 1947 |
| 2,432,467 | Carlbom | Dec. 9, 1947 |